US009346463B2

(12) United States Patent
Koike et al.

(10) Patent No.: US 9,346,463 B2
(45) Date of Patent: May 24, 2016

(54) MODE SWITCHING CONTROL DEVICE FOR A HYBRID VEHICLE

(71) Applicant: Nissan Motor Co., Ltd., Yokohama-shi, Kanagawa (JP)

(72) Inventors: Tomoyuki Koike, Zama (JP); Kengo Kubo, Yokohama (JP); Yoshiaki Kato, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/649,930

(22) PCT Filed: Nov. 25, 2013

(86) PCT No.: PCT/JP2013/081583
§ 371 (c)(1),
(2) Date: Jun. 5, 2015

(87) PCT Pub. No.: WO2014/087856
PCT Pub. Date: Jun. 12, 2014

(65) Prior Publication Data
US 2015/0314777 A1 Nov. 5, 2015

(30) Foreign Application Priority Data

Dec. 7, 2012 (JP) ................................. 2012-268217

(51) Int. Cl.
*B60W 20/00* (2016.01)
*B60W 10/06* (2006.01)
(Continued)

(52) U.S. Cl.
CPC ................ *B60W 20/40* (2013.01); *B60K 6/442* (2013.01); *B60K 6/543* (2013.01); *B60L 3/0023* (2013.01); *B60L 7/14* (2013.01); *B60L 11/14* (2013.01); *B60L 11/1861* (2013.01); *B60L 15/20* (2013.01); *B60L 15/2009* (2013.01);
(Continued)

(58) Field of Classification Search
USPC .......................................................... 701/22
See application file for complete search history.

(56) References Cited

U.S. PATENT DOCUMENTS

| 6,190,282 B1 * | 2/2001 | Deguchi | B60K 6/442 |
| | | | 180/65.23 |
| 6,338,391 B1 * | 1/2002 | Severinsky | B60K 6/442 |
| | | | 180/65.23 |

(Continued)

FOREIGN PATENT DOCUMENTS

| JP | 2000-199442 A | 7/2000 |
| JP | 2000-225859 A | 8/2000 |

(Continued)

*Primary Examiner* — Thomas Tarcza
*Assistant Examiner* — Tyler J Lee
(74) *Attorney, Agent, or Firm* — Global IP Counselors, LLP (57) ABSTRACT

During engine startup and engagement of a transmission clutch in response to an EV→HEV mode-switch demand, the transmission clutch is engaged, which precedes initiation of self-sustaining running by the engine. During the clutch engagement, high engine torque is not input to the transmission clutch, and no large torque differential arises in relation to the torque at the output side of the transmission clutch, which during EV operation is a low value about equal to the low motor torque of an electric motor. Additionally, due to cranking during engine startup, the input/output rotation difference of the transmission clutch is small, and when the transmission clutch is engaged, engagement of the transmission clutch may be carried out with reduced shock, as the input/output torque differential and the input/output rotation difference are small.

5 Claims, 4 Drawing Sheets

(51) Int. Cl.

| | | |
|---|---|---|
| *B60W 10/08* | (2006.01) | |
| *B60W 10/02* | (2006.01) | |
| *B60K 6/442* | (2007.10) | |
| *B60K 6/543* | (2007.10) | |
| *B60L 11/14* | (2006.01) | |
| *F02D 29/02* | (2006.01) | |
| *B60L 3/00* | (2006.01) | |
| *B60L 7/14* | (2006.01) | |
| *B60L 11/18* | (2006.01) | |
| *B60L 15/20* | (2006.01) | |
| *F02D 41/02* | (2006.01) | |
| *F02D 41/06* | (2006.01) | |
| *F02N 11/00* | (2006.01) | |
| *F02N 11/04* | (2006.01) | |
| *B60K 6/48* | (2007.10) | |

(52) U.S. Cl.
CPC ............. *B60W 10/02* (2013.01); *B60W 10/06* (2013.01); *B60W 10/08* (2013.01); *B60W 20/00* (2013.01); *F02D 29/02* (2013.01); *F02D 41/022* (2013.01); *F02D 41/062* (2013.01); *F02N 11/006* (2013.01); *F02N 11/04* (2013.01); *B60K 2006/4808* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2260/26* (2013.01); *B60L 2270/145* (2013.01); *B60W 2520/10* (2013.01); *B60W 2710/021* (2013.01); *B60W 2710/025* (2013.01); *B60W 2710/06* (2013.01); *B60W 2710/08* (2013.01); *F02N 2200/0801* (2013.01); *F02N 2300/2002* (2013.01); *Y02T 10/626* (2013.01); *Y02T 10/6234* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y10S 903/93* (2013.01)

(56) References Cited

U.S. PATENT DOCUMENTS

| | | | |
|---|---|---|---|
| 8,452,469 | B2 * | 5/2013 | Otokawa ................ B60K 6/365 701/111 |
| 2007/0056784 | A1 * | 3/2007 | Joe ............................ B60K 6/48 180/65.245 |
| 2010/0286858 | A1 * | 11/2010 | Otokawa ................ B60K 6/365 701/22 |
| 2014/0236406 | A1 * | 8/2014 | Ishida ................... B60W 10/02 701/22 |

FOREIGN PATENT DOCUMENTS

| | | |
|---|---|---|
| JP | 2000-289471 A | 10/2000 |
| JP | 2007-1425 A | 1/2007 |

* cited by examiner

| | L/B | H/C | R/B |
|---|---|---|---|
| FIRST GEAR | O | × | × |
| SECOND GEAR | × | O | × |
| REVERSE | × | × | O |
| NEUTRAL | × | × | × |

MODE SWITCHING CONTROL DEVICE FOR A HYBRID VEHICLE

CROSS-REFERENCE TO RELATED APPLICATIONS

This application is a U.S. National stage application of International Application No. PCT/JP2013/081583, filed Nov. 25, 2013, which claims priority to Patent Application No. 2012-268217 filed on Dec. 7, 2012, the contents of each of which are hereby incorporated herein by reference.

BACKGROUND

1. Field of the Invention

The present invention relates to a mode-switching control device for a hybrid vehicle, the vehicle having an engine and an electric motor as on-board power sources, and being switchable between an electric operation mode (EV mode) in which the vehicle is operated with the electric motor only, and a hybrid operation mode (HEV mode) in which the vehicle is operated with the electric motor and the engine.

2. Background Information

Hybrid vehicles of this type are known in the prior art and include that disclosed, e.g., in Japanese Laid-Open Patent Application No. 2000-199442.

This hybrid vehicle has a design in which an engine provided as one of the power sources is decouplably drive-coupled to vehicle wheels via a continuously variable transmission and a clutch in that order, whereas an electric motor provided as the other power source is coupled full-time to the wheels.

With this hybrid vehicle, electric operation (EV operation) in EV mode powered by the electric motor alone is possible by stopping the engine and releasing the clutch, while hybrid operation (HEV operation) in HEV mode powered by the electric motor and the engine is possible by starting the engine and engaging the clutch.

By releasing the clutch in the aforedescribed manner during EV operation, the stopped engine (and, when a transmission is present, the transmission as well) is decoupled from the vehicle wheels, and the engine (transmission) is not co-rotated (dragged) during EV operation, avoiding energy losses to a commensurate extent, so that the energy efficiency can be increased.

In the aforedescribed hybrid vehicle, in the case of a change in the running state, such as depressing of the accelerator pedal during EV operation with the engine stopped and the clutch disengaged, the engine is restarted and the clutch is engaged, switching the mode from the EV operation mode to the HEV operation mode.

When the clutch is engaged during the EV→HEV mode-switching, the rotation speed at the input side (the engine side) thereof, being dependent on the engine rotation, is initially low. By contrast, the rotation speed at the output side (vehicle wheel side) of the clutch, being determined by the vehicle speed, is initially high.

Therefore, engagement of the clutch taking place during EV→HEV mode-switching is initiated in a state in which there is a large input/output rotation difference in the clutch, which tends to produced considerable clutch engagement shock (EV→HEV mode-switching shock).

Techniques proposed in the past for reducing clutch engagement shock include, e.g., a technique of shifting the transmission in such a way as to give a small input/output rotation difference in the clutch, as disclosed in Japanese Laid-Open Patent Application No. 2000-289471, and it would be conceivable to employ this clutch engagement shock reduction technique as a countermeasure against EV→HEV mode-switching shock in the aforedescribed hybrid vehicle.

SUMMARY

However, combining the techniques disclosed in Japanese Laid-Open Patent Application No. 2000-199442 and Japanese Laid-Open Patent Application No. 2000-289471 merely reduces the input/output rotation difference in the clutch, but for the reason discussed below, there is a large torque difference between the input and output torque of the clutch.

During shift control carried out for the purpose of reducing the difference in input/output rotation in the clutch, oil from an engine-driven oil pump is indispensable for the transmission, and therefore it is necessary for the engine to be running, meaning that the clutch is engaged after entering an engine-running state subsequent to engine startup.

In this engine-running state subsequent to startup, high torque from the engine is input to the input side of the clutch, unavoidably giving rise to a large torque differential in relation to the torque at the output side of the clutch, which during EV operation is a low value about equal to the electric motor torque.

Therefore, simply combining the techniques disclosed in Japanese Laid-Open Patent Application No. 2000-199442 and Japanese Laid-Open Patent Application No. 2000-289471 to reduce the input/output rotation difference in the clutch makes it inevitable that engagement shock (EV→HEV mode-switching shock) will occur due to the large input/output torque differential of the clutch.

If a slower clutch engagement speed is adopted as a countermeasure against shock, considerable time will be required for clutch engagement to be completed, degrading the EV→HEV mode-switching response, and giving rise to the problem that the drive power demanded in the HEV mode is not obtained for the duration of this degraded large response delay.

The present invention is based on a recognition of the fact that the aforedescribed problem is caused during EV→HEV mode-switching, due to the engine first being brought into the running state through startup, and engagement of the clutch carried out thereafter, and is moreover based on a recognition of the fact that when the clutch is engaged during startup prior to the engine entering the running state, substantially no engine torque is yet being generated, and the clutch input/output torque difference is not large enough to create an issue in terms of shock, and moreover the input/output rotation difference in the clutch during engine startup is small enough to not produce a problem in terms of shock, so that at this time the clutch may be engaged with reduced shock. An object of the present invention is to propose a mode-switching control device for a hybrid vehicle, which embodies this idea and with which it is possible to eliminate the aforedescribed problem.

In order to achieve the above objective, the mode-switching control device for a hybrid vehicle of the present invention follows.

Turning first to a description of the hybrid vehicle on which the present invention is premised, the vehicle is a vehicle which is equipped with an electric motor in addition to an engine as power sources, the engine being drive-coupled to vehicle wheels via a transmission for which oil from a pump driven by the engine is the working medium, the transmission and the vehicle wheels being decouplable by a clutch within the transmission; and in which, by releasing the clutch and stopping the engine, it is possible to select an electric operation mode in which travel is accomplished using the electric motor only, or by starting up the engine and engaging the clutch, it is possible to select a hybrid operation mode in which travel is accomplished using the electric motor and the engine.

The mode-switching control device of the present invention is characterized by the feature that, during startup of the engine and engagement of the clutch to be carried out at the time of mode-switching of the hybrid vehicle from the electric operation mode to the hybrid operation mode, engagement of the clutch is carried out during engine startup preceding initiation of self-sustaining running by the engine.

In the mode-switching control device for a hybrid vehicle according to the present invention, during mode-switching from the electric operation mode to the hybrid operation mode by startup of the engine and engagement of the clutch, engagement of the clutch is carried out during engine startup prior to the engine initiating self-sustaining running, whereby at the time that the clutch is engaged, startup of the engine is in progress prior to self-sustaining running, and high engine torque is not input to the clutch, so a large torque difference does not arise with respect to the output-side torque of the clutch, which during EV operation is at a value about equal to the low electric motor torque.

Additionally, while the aforedescribed engine startup is in progress, the input/output rotation difference in the clutch is small enough to pose no problem in terms of shock, and at this time the clutch can be engaged using oil from the pump in accordance with the engine rotation while engine startup is progress.

Therefore, engagement of the clutch, which needs to be carried out during the aforedescribed mode-switching, may be carried out at a clutch input/output torque differential and input/output rotation difference that are small enough to pose no problem in terms of shock, so engagement shock (EV→HEV mode-switching shock) of the clutch can be reliably alleviated.

For this reason, there is no need to adopt a particularly slow clutch engagement speed as a countermeasure against the shock in question; the time to completion of engagement of the clutch can be shorter; EV→HEV mode-switching (transition to HEV operation) can be accomplished rapidly; and the power demanded for HEV operation can be achieved with high responsiveness.

BRIEF DESCRIPTION OF THE DRAWINGS

Referring now to the attached drawings which form a part of this original disclosure.

FIGS. 2A and 2B illustrate a hybrid vehicle of another design in which it is possible for the mode-switching control device of the present invention to be applied, wherein

DETAILED DESCRIPTION OF EMBODIMENTS

The embodiment of the present invention is described below on the basis of the accompanying drawings.

Embodiment 1

Configuration

Figure 1:
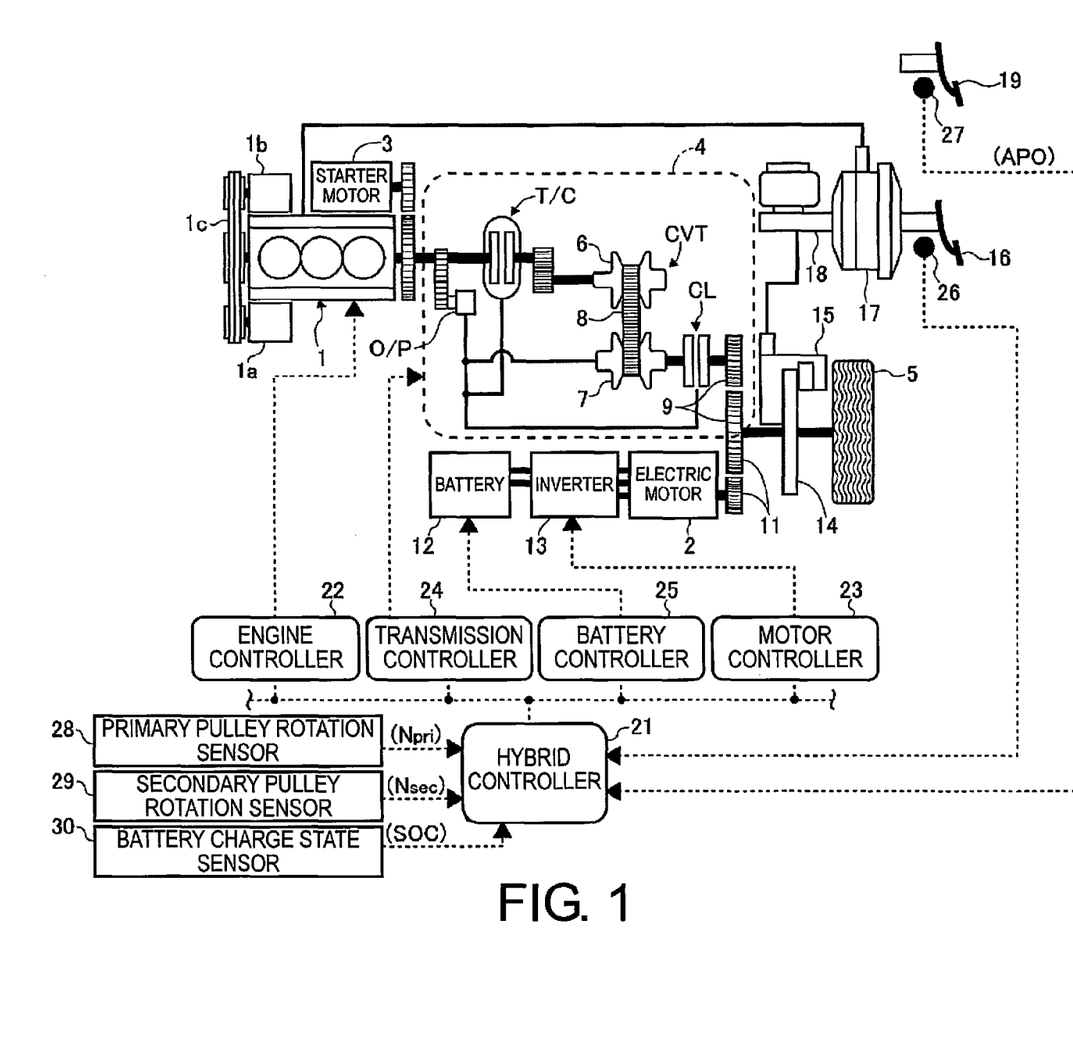
FIG. 1 is a schematic system diagram showing the drive system of a hybrid vehicle equipped with the mode-switching control device according to an embodiment of the present invention, and the overall control system thereof.

FIG. 1 is a schematic system diagram showing the drive system of a hybrid vehicle equipped with the mode-switching control device according to an embodiment of the present invention, and the overall control system thereof.

The hybrid vehicle of FIG. 1 includes an engine 1 and an electric motor 2 as on-board power sources, the engine 1 including a motor/generator 1a and an air conditioner compressor 1b which are drive-coupled by a V-belt 1c to a crankshaft; and while normally started by a starter motor 3, may be started up by the motor/generator 1a if needed.

The motor/generator 1a replaces the usual alternator (generator) installed in drive-coupled fashion to the engine crankshaft, making the power-running function possible as well, and is employed at times of restarting the engine 1 after an idle stop, or at times of carrying out torque assist of the engine 1, as needed, while the engine is running.

The engine 1 is drive-coupled in appropriately decouplable fashion to the drive wheels 5 via a V-belt continuously variable transmission 4. A brief description of the V-belt continuously variable transmission follows.

The V-belt continuously variable transmission 4 has as the primary constituent element a continuously variable transmission mechanism CVT comprising a primary pulley 6, a secondary pulley 7, and a V-belt 8 suspended between the pulleys 6, 7.

The primary pulley 6 is linked to a crankshaft of the engine 1 via a lockup torque converter T/C, and the secondary pulley 7 is linked to the drive wheels 5 by a transmission clutch CL (corresponding to the clutch in the present invention) and a final gear set 9, in that order.

With the transmission clutch CL in the engaged state, power from the engine 1 is input to the primary pulley 6 through the torque converter T/C, and thereafter reaches the drive wheels 5 through the V-belt 8, the secondary pulley 7, the transmission clutch CL, and the final gear set 9, in that order, and is employed for operation of the hybrid vehicle.

During transmission of engine power, by increasing the pulley V groove width of the secondary pulley 7 while decreasing the pulley V groove width of the primary pulley 6, the wound arc diameter of the V-belt 8 about the primary pulley 6 increases, while at the same time the wound arc diameter about the secondary pulley 7 decreases, and the V-belt continuously variable transmission 4 can carry out upshifting to a pulley ratio on the high side (high-side transmission gear ratio).

Conversely, by decreasing the pulley V groove width of the secondary pulley 7 while increasing the pulley V groove width of the primary pulley 6, the wound arc diameter of the V-belt 8 about the primary pulley 6 decreases, while at the same time the wound arc diameter about the secondary pulley 7 increases, and the V-belt continuously variable transmission 4 can carry out downshifting to a pulley ratio on the low side (low-side transmission gear ratio).

The electric motor 2 is drive-coupled full-time to the drive wheels 5 via final gear set 11, the electric motor 2 being driven by electrical power from a battery 12 via an inverter 13.

The inverter 13 converts DC electrical power from the battery 12 to AC electrical power supplied to the electric motor 2, and by increasing or decreasing the supplied electrical power to the electric motor 2, controls the drive power and controls the rotation direction of the electric motor 2.

The electric motor 2, in addition to motor driving in the aforedescribed manner, functions also as a generator, and is employed for regenerative braking, discussed below.

At times of regenerative braking, the inverter 13 places a generation load equivalent to the regenerative braking force on the electric motor 2, thereby prompting the electric motor 2 to act as a generator, the generated power of the electric motor 2 being stored to the battery 12.

In the hybrid vehicle equipped with the drive system described above in FIG. 1, when the electric motor 2 is driven in a state in which the transmission clutch CL is disengaged and the engine 1 is stopped, only the power of the electric motor 2 reaches the drive wheels 5 through the final gear set 11, and the hybrid vehicle can be operated in electric operation mode (EV mode) by the electric motor 2 alone.

During this time, due to the transmission clutch CL being disengaged, the engine 1 in the stopped state is not co-rotated, and unnecessary power consumption during EV operation can be minimized.

In the aforedescribed EV operation state, when the engine 1 is started up by the motor/generator 1a or by the starter motor 3, and the transmission clutch CL is engaged, and power from the engine 1 reaches the drive wheels 5 through the torque converter T/C, the primary pulley 6, the V-belt 8, the secondary pulley 7, the transmission clutch CL, and the final gear set 9 in that order, so that the hybrid vehicle can be operated in hybrid operation mode (HEV mode) by the engine 1 and the electric motor 2.

To bring the hybrid vehicle to a stop from the operating state described above, or to maintain this stopped state, this object is achieved by squeezing of brake disks 14, which rotate in tandem with the drive wheels 5, by calipers 15 to brake the wheels.

The calipers 15 are connected to a master cylinder 18 which is actuated in response to depressing of a brake pedal 16 depressed by the driver, and which outputs brake fluid pressure corresponding to the brake pedal depression force, at boost force provided by a negative pressure brake booster 17, the calipers 15 being actuated by the brake fluid pressure and carrying out braking of the brake disks 14.

In either the EV mode or the HEV mode, the hybrid vehicle drives the drive wheels 5 at a level of torque in response to a drive power command input through depressing of an accelerator pedal 19 by the driver, and is operated at drive power in accordance with that demanded by the driver.

The functions of selecting the operating mode of the hybrid vehicle, output control of the engine 1, rotation direction control and output control of the electric motor 2, shift control of the continuously variable transmission 4 and engagement/disengagement control of the transmission clutch CL, and charge/discharge control of the battery 12 are respectively controlled by the hybrid controller 21, via a corresponding engine controller 22, motor controller 23, transmission controller 24, and battery controller 25.

For this reason, the hybrid controller 21 inputs a signal from a normally-open brake switch 26 that switches from OFF to ON during braking by depressing of the brake pedal 16, a signal from an accelerator opening amount sensor 27 that detects the amount of accelerator pedal depression (accelerator opening amount) APO, a signal from a primary pulley rotation sensor 28 that detects the rotation speed Npri of the primary pulley 6, a signal from a secondary pulley rotation sensor 29 that detects the rotation speed Nsec of the secondary pulley 7, and the signal from the battery charge state sensor 30 for detecting the state of charge SOC (can be taken out power) of the battery 12.

The hybrid controller 21 additionally exchanges internal information with the engine controller 22, the motor controller 23, transmission controller 24, and battery controller 25.

The engine controller 22, in response to a command from the hybrid controller 21, performs output control of the engine 1; and the motor controller 23, in response to a command from the hybrid controller 21, performs rotation direction control and output control of the electric motor 2 via the inverter 13.

The transmission controller 24, in response to a command from the hybrid controller 21, uses oil from an engine-driven oil pump O/P as the medium, or when a working medium is needed, uses oil from an electric pump E/P as the working medium, to carry out shift control of the continuously variable transmission 4 (V-belt continuously variable transmission mechanism CVT), as well lockup control of a torque converter T/C, and engagement/disengagement control of the transmission clutch CL.

The battery controller 25, in response to a command from the hybrid controller 21, performs charge/discharge control of the battery 12.

Figure 2A:
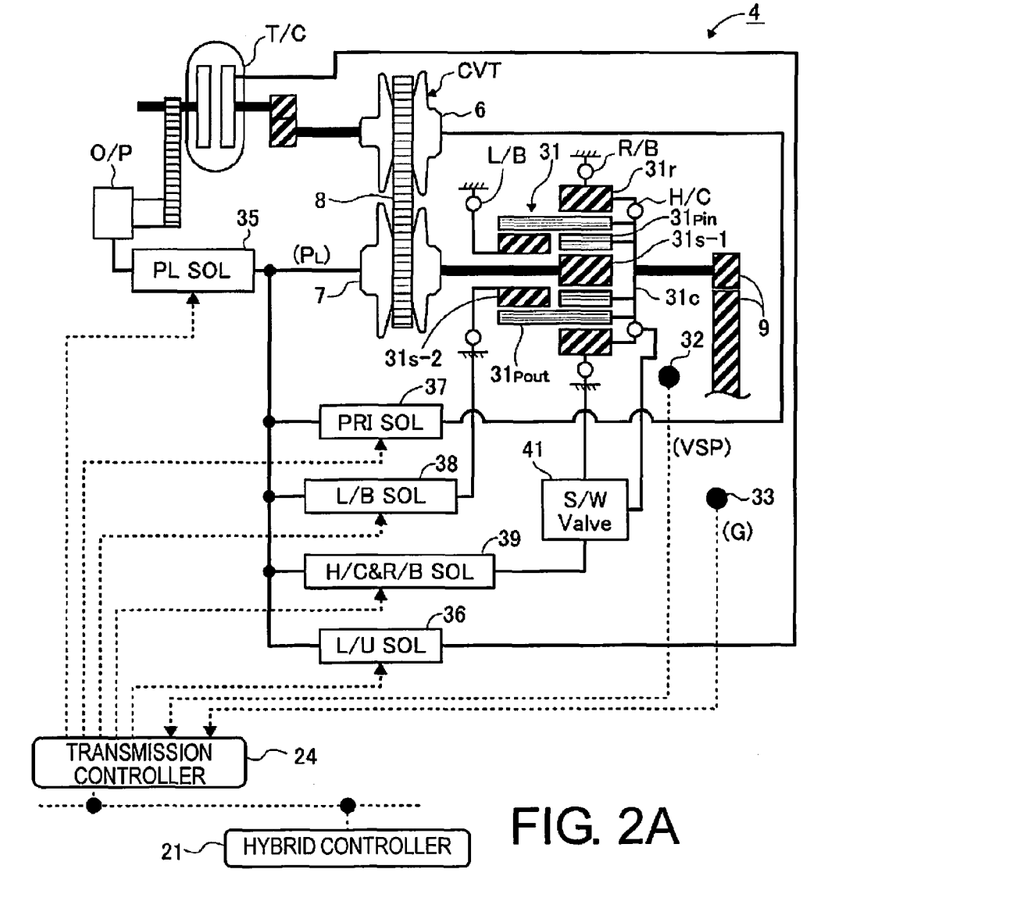
FIG. 2A is a schematic system diagram showing the drive system of the hybrid vehicle, and the overall control system thereof.

In FIG. 1, the transmission clutch CL has been provided for exclusive use by the continuously variable transmission 4, in order to decouplably link the V-belt continuously variable transmission mechanism CVT (the secondary pulley 7) and the drive wheels 5; however, when, as shown in exemplary fashion in FIG. 2(a), the continuously variable transmission 4 incorporates an auxiliary transmission 31 between the V-belt continuously variable transmission mechanism CVT (the secondary pulley 7) and the drive wheels 5, friction elements (a clutch, brake, or the like) responsible for shifting of the auxiliary transmission 31 may be put to additional use to decouplably link the V-belt continuously variable transmission mechanism CVT (the secondary pulley 7) and the drive wheels 5.

In this case, it would not be necessary to additionally provide the dedicated clutch CL for the purpose of decouplably linking the V-belt continuously variable transmission mechanism CVT (the secondary pulley 7) and the drive wheels 5, which is advantageous from a cost standpoint.

The auxiliary transmission 31 of FIG. 2A is formed a Ravigneaux planetary gear set comprising compound sun gears 31s-1 and 31s-2, an inner pinion 31pin, an outer pinion 31pout, a ring gear 31r, and a carrier 31c rotatably supporting the pinions 31pin, 31pout.

Of the compound sun gears 31s-1 and 31s-2, the sun gear 31s-1 is linked to the secondary pulley 7 so as to act as an input rotation member, while the sun gear 31s-2 is arranged coaxially with respect to the secondary pulley 7, and is able to rotate freely.

The inner pinion 31pin meshes with the sun gear 31s-1, and the inner pinion 31pin and the sun gear 31s-2 respectively mesh with the outer pinion 31pout.

The outer pinion 31pout meshes with the inner circumference of the ring gear 31r, linking the carrier 31c to the final gear set 9 in such a way as to act as an output rotation member.

The carrier 31c and the ring gear 31r are designed to be linkable in appropriate fashion through a high clutch H/C, the ring gear 31r is designed to be capable of being fixed in appropriate fashion by a reverse brake R/B, and the sun gear 31s-2 is designed to be capable of being fixed in appropriate fashion by a low brake L/B.

Figure 2B:
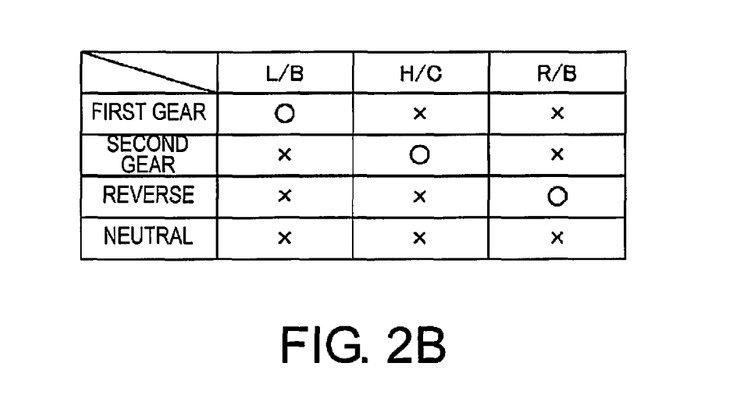
FIG. 2B is an engagement logic diagram of gearshift friction elements in an auxiliary transmission incorporated within a V-belt continuously variable transmission in the drive system of the hybrid vehicle.

The auxiliary transmission 31 engages the shift friction elements, i.e., the high clutch H/C, the reverse brake R/B, and the low brake L/B, in the combinations shown by the "○" symbols in FIG. 2B, and at other times releases the elements as shown by the "x" symbols in FIG. 2B, whereby a gear level of forward first gear, second gear, or reverse can be selected.

When the high clutch H/C, the reverse brake R/B, and the low brake L/B are all released, the auxiliary transmission 31 is placed in neutral, in which power transmission does not take place; and in this state, engaging the low brake L/B causes the auxiliary transmission 31 to select forward first gear (reducing), engaging the high clutch H/C causes the auxiliary transmission 31 to select forward second gear (direct drive), and engaging the reverse brake R/B causes the auxiliary transmission 31 to select reverse (reverse rotation).

By releasing all of the shift friction elements H/C, R/B, and L/B and placing the auxiliary transmission 31 in neutral, the continuously variable transmission 4 of FIG. 2A can decouple the V-belt continuously variable transmission mechanism CVT (the secondary pulley 7) and the drive wheels 5.

Consequently, in the continuously variable transmission 4 of FIG. 2A, the shift friction elements H/C, R/B, and LB of the auxiliary transmission 31 take on the role of the transmission clutch CL in FIG. 1, and the V-belt continuously variable transmission mechanism CVT (the secondary pulley 7) and the drive wheels 5 can be decouplably linked, without the need to additionally provide the transmission clutch CL as in FIG. 1.

The continuously variable transmission 4 of FIG. 2A is controlled by oil from the engine-driven oil pump O/P as the working medium, with the transmission controller 24 carrying out the control in question of the continuously variable transmission 4 in the following manner, via a line pressure solenoid 35, a lockup solenoid 36, a primary pulley pressure solenoid 37, a low brake pressure solenoid 38, a high clutch pressure & reverse brake pressure solenoid 39, and a switch valve 41.

In addition to the signals described with reference to FIG. 1, the transmission controller 24 inputs a signal from a vehicle speed sensor 32 that detects vehicle speed VSP, and a signal from an acceleration sensor 33 that detects vehicle acceleration/deceleration speed G.

The line pressure solenoid 35, when actuated in response to a command from the transmission controller 24, performs pressure adjustment of the oil from the oil pump O/P (or from the electric pump E/P) to a line pressure $P_L$ that corresponds to the vehicle's demanded drive power, and constantly supplies this line pressure $P_L$ as secondary pulley pressure to the secondary pulley 7, whereby the secondary pulley 7 squeezes the V-belt 8 at a thrust commensurate with the line pressure $P_L$, so no slippage occurs.

The lockup solenoid 36, when actuated in response to a command from the transmission controller 24, directs the line pressure $P_L$ in proper fashion towards the torque converter T/C to actuate engagement or slip linkage of a lockup clutch (lockup mechanism), not illustrated, whereby the torque converter T/C, when needed, is placed in a lockup state in which the input/output elements are directly linked such that there is no relative rotation (slip) among them, or placed in a slip lockup state in which the input/output elements are slip-linked so as experience relative rotation within a predetermined rotation tolerance.

The primary pulley pressure solenoid 37, when actuated in response to a CVT transmission gear ratio command from the transmission controller 24, performs pressure adjustment of the line pressure $P_L$ to the primary pulley pressure, and supplies this pressure to the primary pulley 6, whereby the V groove width of the primary pulley 6 and the V groove width of the secondary pulley 7 supplied with the line pressure $P_L$ are controlled such that the CVT transmission gear ratio agrees with that of the command from the transmission controller 24, accomplishing the CVT transmission gear ratio command from the transmission controller 24.

When the transmission controller 24 has issued a first gear selection command for the auxiliary transmission 31, the low brake pressure solenoid 38 supplies the line pressure $P_L$ as low brake pressure to the low brake L/B to bring about engagement thereof, and accomplish the first gear selection command.

When the transmission controller 24 has issued a second gear selection command or a reverse selection command for the auxiliary transmission 31, the high clutch pressure & reverse brake pressure solenoid 39 supplies the line pressure $P_L$ as high clutch pressure & reverse brake pressure to the switch valve 41.

At times of a second gear selection command, the switch valve 41 directs the line pressure $P_L$ from the solenoid 39 as high clutch pressure towards the high clutch H/C to bring about engagement thereof, and accomplish the second gear selection command of the auxiliary transmission 31.

At times of a reverse selection command, the switch valve 41 directs the line pressure $P_L$ from the solenoid 39 as reverse brake pressure towards the reverse brake R/B to bring about engagement thereof, and accomplish the reverse selection command of the auxiliary transmission 31.

Mode-Switching Control

Mode-switching control of the aforedescribed hybrid vehicle will be described below, taking the case of a vehicle drive system like that shown in FIG. 1.

During HEV operation, when the accelerator pedal 19 is released to switch over to a coasting (inertia) operation, or when the brake pedal 16 is subsequently depressed to brake the vehicle, the kinetic energy of the vehicle is converted to electrical power through regenerative braking by the electric motor 2, and is stored in the battery 12, thus improving the energy efficiency.

If regenerative braking takes place while remaining in HEV operation (HEV regeneration), because the transmission clutch CL is in the engaged state, there will be a decline in regenerative braking energy, by the equivalent of the reverse drive power (engine braking) of the engine 1 and the equivalent of the friction of the continuously variable transmission 4, making for poor energy regeneration efficiency.

For this reason, once regenerative braking has been initiated during HEV operation, the transmission clutch CL is released, thereby decoupling the engine 1 and the continuously variable transmission 4 from the drive wheels 5, and bringing about a switchover to EV operation and creating an EV regeneration state, whereby the engine 1 and the continuously variable transmission 4 are no longer co-rotated, affording an equivalent amount of energy regeneration.

On the other hand, when the transmission clutch CL has been released in the aforedescribed manner, in order to stop the engine 1 to avoid an unnecessary operation in response to concerns related to fuel consumption, recommencing fuel injection to the engine 1 (fuel recovery) is prohibited so that fuel injection to the engine 1 (fuel cutoff), which was executed during the aforedescribed coasting operation, continues to be prohibited even after the aforedescribed release of the transmission clutch CL. The engine 1 is thereby stopped at the time that the transmission clutch CL is released.

Through the above procedure, switching from the HEV mode to the EV mode is completed.

When the running state changes due to depressing of the accelerator pedal 19 or the like during the EV mode, producing a mode-switching request from the EV mode to the HEV mode, the engine 1 is restarted, and the transmission clutch CL is engaged to carry out switching from the EV mode to the HEV mode.

At the time of engagement of the transmission clutch CL carried out during the EV→HEV mode-switching, the input-side rotation speed thereof (the secondary pulley rotation speed Nsec), being dependent on the engine rotation speed Ne, is initially low.

In contrast to this, the rotation speed at the output side (vehicle wheel side) of the transmission clutch CL, being determined by the vehicle speed VSP, is initially high.

Therefore, engagement of the transmission clutch CL, when carried out during EV→HEV mode-switching, is initiated in a state in which there is a large input/output rotation difference in the transmission clutch CL, which tends to produced considerable clutch engagement shock (EV→HEV mode-switching shock).

When reducing this clutch engagement shock, shifting the continuously variable transmission 4 in such a way as to minimize the large input/output rotation difference in the transmission clutch CL can be attempted, because oil from the engine-driven oil pump O/P is indispensable for the continuously variable transmission 4, it is necessary for the engine 1 to be running, meaning that the transmission clutch CL is engaged after the engine 1 has entered the running state subsequent to engine startup.

In this post-startup engine running state, high torque from the engine 1 is input to the input side of the transmission clutch CL, unavoidably giving rise to a large torque differential in relation to the torque at the output side of the transmission clutch CL, which during EV operation is a low value about equal to the electric motor torque.

Therefore, if the continuously variable transmission 4 is simply shifted in such a way as to minimize the input/output rotation difference in the transmission clutch CL, it will be inevitable that engagement shock (EV→HEV mode-switching shock) will occur, due to the aforedescribed large input/output torque differential of the transmission clutch CL.

If a slower engagement speed of the transmission clutch CL is adopted as a countermeasure against the shock in question, considerable time will be necessary for the transmission clutch CL to complete engagement, and this degrades the EV→HEV mode-switching response, giving rise to the problem that the drive power demanded in the HEV mode is not obtained during the response delay.

According to the present embodiment, a solution to the aforedescribed problem is achieved through EV→HEV mode-switching control. That is, instead of a shock countermeasure that relies on input/output rotation synchronization control of the transmission clutch CL via shifting of the continuously variable transmission 4, the transmission clutch CL engagement under the conditions of reduced shock resulting from a state in which, as a matter of course, the input/output rotation difference, as well as the input/output torque differential, of the transmission clutch CL are small is ensured.

In specific terms, during EV→HEV mode-switching, by carrying out engagement of the transmission clutch CL while startup of the engine 1 is in progress at a point in time prior to entering the running state, i.e., at a point in time at which substantially no engine torque is being produced, at which the input/output torque differential of the transmission clutch CL is not great enough to produce problems in terms of shock, and moreover at which the input/output rotation difference in the transmission clutch CL resulting from faster rotation of the engine 1 as startup proceeds is small enough so that problems in terms of shock do not occur, engagement can be carried out under conditions of reduced shock, at a small input/output torque differential and input/output rotation difference.

Figure 3:
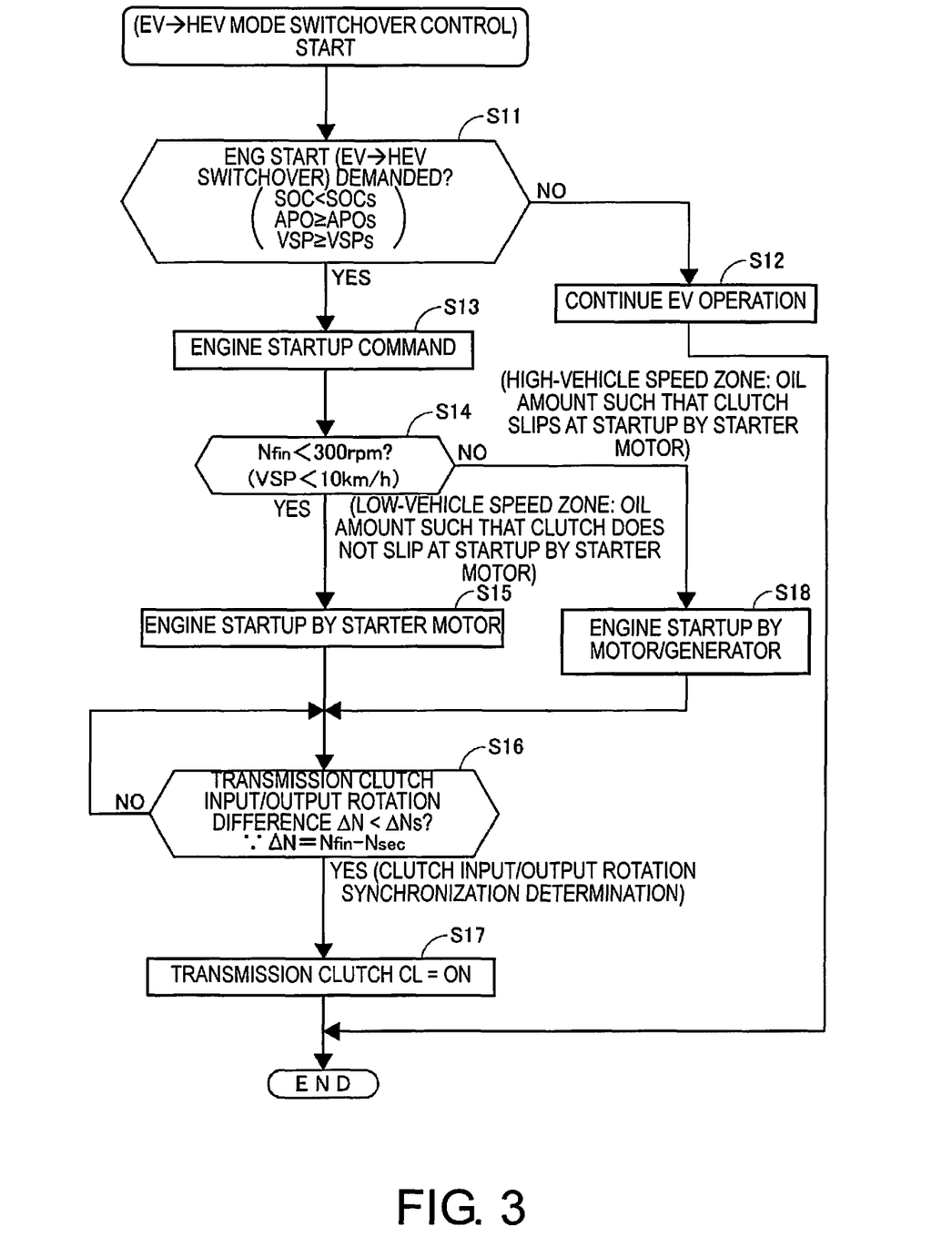
FIG. 3 is a flowchart showing an EV→HEV mode-switching control program executed by a hybrid controller in FIG. 1.
Figure 4:
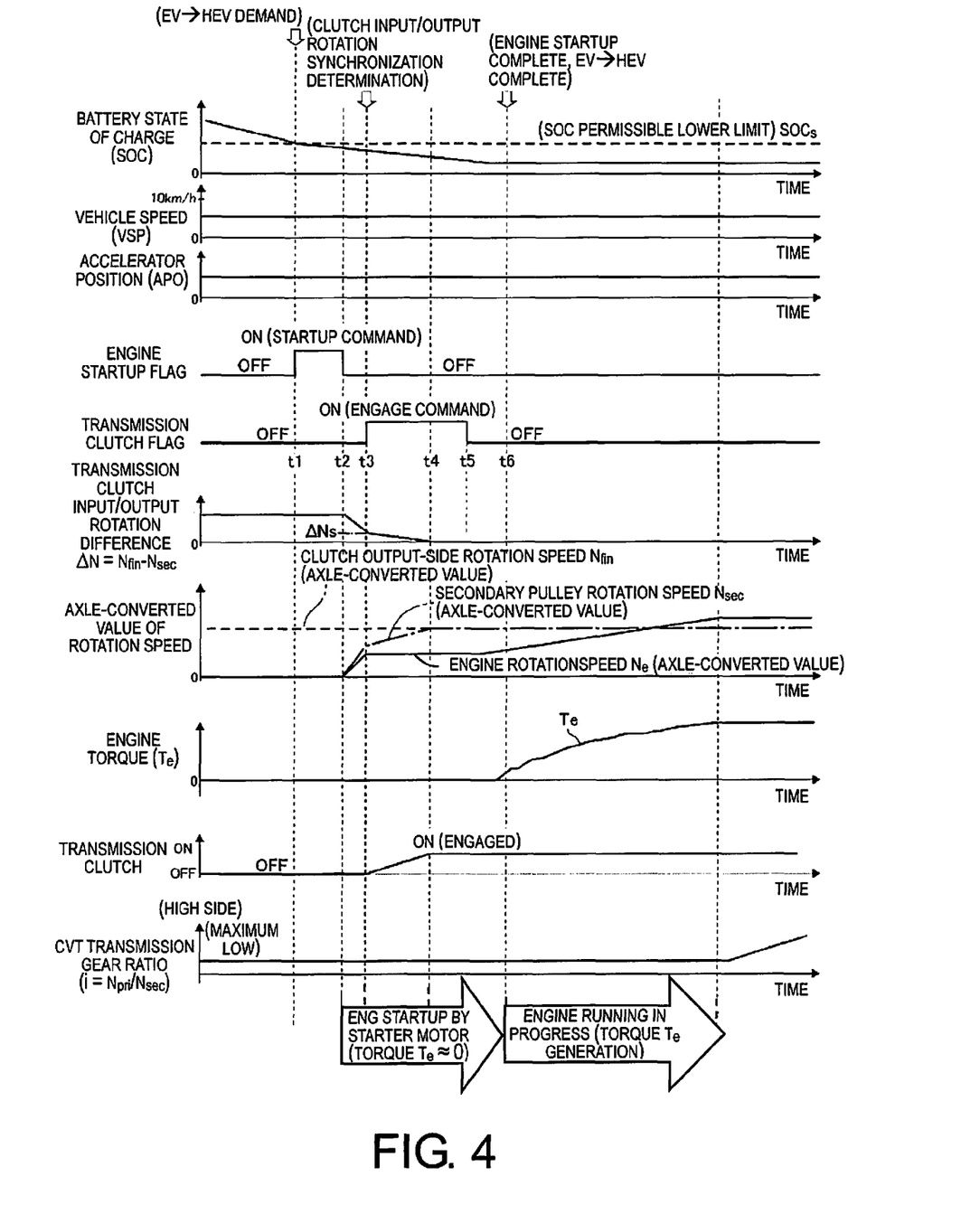
FIG. 4 is a performance time chart of EV→HEV mode-switching by the mode-switching control of FIG. 3.

In order to accomplish this, the hybrid controller 21 of FIG. 1 executes the control program of FIG. 3, and via the engine controller 22 and the transmission controller 24 accomplishes EV→HEV mode-switching control as shown by the time chart of FIG. 4, In step S11 of FIG. 3, a check is performed as to whether an engine restart demand (EV→HEV mode-switching demand) has been generated.

When performing this check, a determination is made as whether there is a demand for engine startup (EV→HEV mode-switching), doing so by making reference to whether the battery state of charge SOC is less than a permissible lower limit value SOCs (charge demand determination value) shown in FIG. 4 thus necessitating charging of the battery 12, to whether the accelerator position APO is at or above a set value APOs so that the demanded power can no longer be generated by the electric motor 2 alone, or to whether the vehicle speed VSP is equal to or above a set value VSPs in a motor high-rotation zone in which power from the electric motor 2 alone represents a power deficit.

FIG. 4 is an actuation time chart of a case in which, during EV operation with the vehicle speed VSP constant (at less than 10 km/h) and with the same accelerator position APO maintained, an engine startup demand (EV→HEV mode-switching demand) is generated at moment t1, due to a condition in which SOC<SOCs.

As long as it continues to be determined in step S11 that an engine startup demand (EV→HEV mode-switching demand) has not been generated, the current EV operation is to be continued, making the EV→EV mode-switching control of FIG. 3 is unnecessary, and therefore in step S12 EV operation continues, and control is terminated.

In the case of a determination in step S11 that an engine restart demand (EV→HEV mode-switching demand) has been generated (upon reaching moment t1 of FIG. 4), control is advanced to step S13, and mode switching from the current EV operation to HEV operation is carried out as follows, in accordance with the demand.

In step S13, an engine startup flag goes ON as in moment t1-t2 of FIG. 4, commanding startup of the engine 1.

In the next step S14, the output-side rotation speed Nfin of the transmission clutch CL (calculated from the vehicle speed VSP and the final reduction ratio of the final gear set 9, the axle-converted value thereof being shown by a broken line in FIG. 4) is computed, and depending on whether this transmission clutch output-side rotation speed Nfin is less than a set rotation speed (e.g., 300 rpm), a check is performed as to whether the vehicle speed VSP is in a low-vehicle speed zone lying below a set vehicle speed (e.g., 10 km/h).

The set rotation speed (300 rpm) that relates to the transmission clutch output-side rotation speed Nfin, and the set vehicle speed (e.g., 10 km/h) that relates to the vehicle speed VSP, correspond to an upper limit vehicle speed of the low-vehicle speed zone. In this zone the rotation inertia (which increases at greater vehicle speed VSP) of the transmission-side rotation system (the rotation system between the transmission clutch CL and the engine 1), which experiences rotation acceleration by the vehicle wheels 5 due to engagement of the transmission clutch CL at the time of EV→HEV mode-switching, is lower than the engaging force of the transmission clutch CL, which is determined by the amount of oil from the oil pump O/P in accordance with the engine cranking speed obtained from the starter motor 3 during startup initiated in response to the engine startup command.

Thus, in cases in which, in step S14, the vehicle speed is determined to be in the low-vehicle speed zone of Nfin<300 rpm (VSP<10 km/h), this means that when startup (cranking) of the engine 1 is carried out by the starter motor 3 designed to produce low rotation, i.e., at the low engine cranking rotation speed provided by the starter motor 3, acceleration of rotation of the transmission-side rotation system between the transmission clutch CL and the engine 1 to bring the system up to a speed equivalent to the vehicle speed will be possible, without encountering slip during engagement of the transmission clutch CL which is carried out by oil from the engine-driven oil pump O/P.

However, in cases in which, in step S14, the vehicle speed is determined to be in a high-vehicle speed zone of Nfin≥300 rpm (VSP≥10 km/h), this means that when startup (cranking) of the engine 1 is carried out by the starter motor 3 designed to produce low rotation, i.e., at the low engine cranking rotation speed provided by the starter motor 3, will not be possible through engagement of the transmission clutch CL, which is carried out by oil from the engine-driven oil pump O/P, to accelerate the rotation of the transmission-side rotation system between the transmission clutch CL and the engine 1 sufficient to bring the system up to a speed equivalent to the vehicle speed in a reliable manner, and the transmission clutch CL may slip and overheat, leading to diminished endurance.

In this case, instead of using the existing starter motor 3, the engine 1 is cranked at high rotation through power-running by the motor/generator 1a designed to produce high rotation, and the amount of oil from the engine-driven oil pump O/P is increased, whereby the engaging force of the transmission clutch CL reaches a high level of engaging force such that rotation by the transmission-side rotation system between the transmission clutch CL and the engine 1 may accelerated reliably up to a speed equivalent to the vehicle speed.

In so doing, slip of the transmission clutch CL is eliminated, and diminished endurance due to overheating is prevented.

As will be appreciated from the above, in the time chart of FIG. 4 which corresponds to a case in which, in step S14, the vehicle speed is determined to be in the low-vehicle speed zone of Nfin<300 rpm (VSP<10 km/h), control is advanced to step S15, whereupon the engine 1 is cranked by the existing starter motor 3 as will be clear from the rise in the engine rotation speed Ne starting at moment t2, and startup control of the engine 1 is initiated.

Starting at moment t2 in FIG. 4, the engine rotation speed Ne rises in the illustrated manner due to startup control (cranking) of the engine 1, at which time the secondary pulley rotation speed Nsec, i.e., the input-side rotation speed of the transmission clutch CL, rises a in divergent manner from the engine rotation speed Ne, by the equivalent of slip of the torque converter T/C and the equivalent of the transmission gear ratio i=Npri/Nsec of the continuously variable transmission mechanism CVT.

Due to the rise of the secondary pulley rotation speed Nsec, i.e., the input-side rotation speed of the transmission clutch CL, the input/output rotation speed differential ΔN=Nfin− Nsec of the transmission clutch CL between the output-side rotation speed Nfin of the transmission clutch CL and the secondary pulley rotation speed Nsec (the input-side rotation speed of the transmission clutch CL) gradually decreases, starting from moment t2 in FIG. 4.

In the next step S16, a check is performed as to whether the input/output rotation speed differential ΔN of the transmission clutch CL has, as a result of the aforedescribed gradual decrease, reached a value less than a very small set value ΔNs for determining synchronization.

During the interval that ΔN≥ΔNs (input/output rotation synchronization of the transmission clutch CL is incomplete), control is returned to the original state, and through cranking of the engine 1 by the starter motor 3 in step S15, the input/output rotation speed differential ΔN of the transmission clutch CL is further gradually decreased.

Upon thereby reaching a condition in which ΔN<ΔNs as at moment t3 in FIG. 4 (input/output rotation synchronization of the transmission clutch CL is completed), determination of this fact is made in step S16, and control advances to step S17.

In this step S17, a transmission clutch flag is set to ON at moment t3-t5 in FIG. 4, whereby oil from the oil pump O/P advances the transmission clutch CL into engagement as shown at moment t3-t4 in FIG. 4, and engagement of the transmission clutch CL is completed at moment t4.

By advancement of the transmission clutch CL into engagement at moment t3-t4, the input/output rotation difference ΔN of the transmission clutch CL is brought from the very small set value ΔNs for determining synchronization, to zero.

In so doing, as may be clearly seen from the rise in engine torque Te, at moment t6 which follows the moment t4 at which engagement of the transmission clutch CL taking place during EV→HEV mode-switching is completed, the engine 1 reaches complete explosion through a combination of cranking by the starter motor 3 from moment t2-t6, and fuel injection and ignition at discretionary timing during the period in question (description is omitted here), and enters the self-sustaining running state.

In the above manner, both startup of the engine 1 and engagement of the transmission clutch CL which are to take place during EV→HEV mode-switching are completed by moment t6, thus completing EV→HEV mode-switching.

In a case in which, in step S14, the vehicle speed is determined to be in a high-vehicle speed zone of Nfin≥300 rpm (VSP≥10 km/h), as described above, when engine startup (cranking) is carried out by the existing starter motor 3 in the aforedescribed manner, the engine cranking rotation speed is low, and the amount of oil from the engine-driven oil pump O/P is not sufficient, leading to a deficit of engaging force by the transmission clutch CL, to failure to accelerate the rotation of the transmission-side rotation system between the transmission clutch CL and the engine 1 up to a speed equivalent to the vehicle speed, and to slip of the transmission clutch CL, resulting in overheating and diminished endurance.

For this reason, in cases in which, in step S14, the vehicle speed is determined to be in the high-vehicle speed zone of Nfin≥300 rpm (VSP≥10 km/h), control advances to step S18, and thereafter a loop leading to step S16 and step S17 is selected.

In step S18, instead of using the existing starter motor 3, the engine 1 is cranked at high rotation through power-running by the motor/generator 1a designed to produce high rotation, and the amount of oil from the engine-driven oil pump O/P is increased to one greater than that during engine startup by the starter motor 3.

In so doing, the engaging force of the transmission clutch CL is brought to a high level of engaging force that can reliably accelerate the rotation acceleration of the transmission-side rotation system between the transmission clutch CL and the engine 1, to bring the system up to a speed equivalent to the vehicle speed, and EV→EV mode-switching control in the manner described above can be accomplished while avoiding slip (overheating) of the transmission clutch CL at times of high vehicle speed.

Effect

According to the EV→HEV mode-switching control of the aforedescribed present embodiment, effects such as the following, described in relation to FIG. 4, are achieved.

In a case in which an EV→HEV mode-switching demand has been generated at moment t1, the mode switching in question is carried out by restarting the engine 1 and engaging the transmission clutch CL, but at the time when the transmission clutch CL engages, the input-side rotation speed (secondary pulley rotation speed Nsec) thereof, being dependent on the engine rotation speed Ne, is low, whereas the output-side rotation speed Nfin corresponds highly to the vehicle speed VSP.

Therefore, engagement of the transmission clutch CL carried out during EV→HEV mode-switching is initiated in a state in which a large input/output rotation speed differential ΔN exists, generating large clutch engagement shock (shock (EV→HEV mode-switching shock).

When, as a shock countermeasure, shifting the continuously variable transmission 4 in such a way as to make the input/output rotation difference ΔN of the transmission clutch CL smaller (so as to synchronize the input and output rotation of the transmission clutch CL) is attempted, because oil from the engine-driven oil pump O/P is indispensable for the continuously variable transmission 4, it is necessary for the engine 1 to be running. That is, the transmission clutch CL is engaged only after the engine 1 has entered the running state subsequent to startup.

In this post-startup engine running state, high torque from the engine 1 is input to the input side of the transmission clutch CL, generating a large torque differential in relation to the torque at the output side of the transmission clutch CL, which during EV operation is a low value about equal to the electric motor torque.

Therefore, if the continuously variable transmission 4 is simply shifted in such a way as to reduce the input/output rotation difference ΔN of the transmission clutch CL, it will be inevitable that engagement shock (EV→HEV mode-switching shock) will occur, due to the aforedescribed large input/output torque differential of the transmission clutch CL.

If a slower engagement speed of the transmission clutch CL is adopted as a countermeasure against the shock in question, considerable time will be needed for the transmission clutch CL to complete engagement, and this will degrade the EV→HEV mode-switching response, giving rise to the problem that, during the response delay, the drive power demanded in the HEV mode fails to be obtained.

In the present embodiment, however, during EV→HEV mode-switching by carrying out startup of the engine 1 and engagement of the transmission clutch CL, engagement of the transmission clutch CL is brought about at moment t3-t4 when engine startup is in progress at a point in time prior to moment t6 at which the engine 1 initiates self-sustaining running, whereby as may be clearly seen from the waveform of the engine torque Te in the interval t3-t4 lying within the interval t2-t6 that precedes self-sustaining running of the engine 1, at the time that the transmission clutch CL engages at t3-t4, high engine torque is not input to the transmission clutch CL, and no large torque differential arises in relation to the torque at the output side of the transmission clutch CL, which during EV operation is a low value about equal to the low motor torque of the electric motor 2.

Additionally, due to cranking taking place during the aforedescribed engine startup interval t2-t6, the input/output rotation difference ΔN of the transmission clutch CL at moment t3 is small enough that there is no problem in terms of shock, and at this moment t3, the transmission clutch CL is engaged by oil from the oil pump O/P in accordance with the engine rotation during cranking, whereby engagement of the transmission clutch CL to be carried out during EV→HEV mode-switching may be carried out in the presence of a clutch input/output torque differential and input/output rotation difference that are small enough to pose no problem in terms of shock, so engagement shock (EV→HEV mode-switching shock) of the transmission clutch CL can be reliably alleviated.

For this reason, there is no need to adopt a particularly slow engagement speed for the transmission clutch CL as a countermeasure against the shock in question; the time to completion of engagement of the transmission clutch CL can be shorter; EV→HEV mode-switching (transition to HEV operation) can be accomplished rapidly; and the power demanded for HEV operation can be achieved with high responsiveness, improving the running properties during EV→HEV mode-switching.

Further, in the present embodiment, in cases in which, in step S14, the vehicle speed is determined to be in a low-vehicle speed zone of Nfin<300 rpm (VSP<10 km/h), i.e., cases of a low-vehicle speed zone such that, with cranking of the engine 1 by the existing starter motor 3 designed to produce low rotation, the amount of oil from the oil pump O/P is sufficient to bring the engaging force of the transmission clutch CL to a level of engaging force sufficient to accelerate the rotation of the transmission-side rotation system between the transmission clutch CL and the engine 1 and bring the system up to a speed equivalent to the vehicle speed, the engine is started up by the existing starter motor 3 (step S15), whereas in cases in which, in step S14, the vehicle speed is determined to be in a high-vehicle speed zone of Nfin≥300 rpm (VSP≥10 km/h), i.e., cases of a high-vehicle speed zone such that, when engine startup (cranking) is performed by the existing starter motor 3 designed to produce low rotation, the amount of oil from the oil pump O/P is not sufficient, leading to a deficit of engaging force by the transmission clutch CL, and failure to accelerate rotation of the transmission-side rotation system between the transmission clutch CL and the engine 1 to bring the system up to a speed equivalent to the vehicle speed, and to slip of the transmission clutch CL, resulting in diminished endurance due to overheating, instead of using the existing starter motor 3, the engine 1 is started up by the motor/generator 1*a* designed to produce high rotation (step 18).

The aforedescribed effect can be achieved over the entire vehicle speed range.

Other Embodiments

In the illustrated example, a description was laid out of EV→HEV mode-switching control in cases in which the hybrid vehicle is equipped with the drive system shown in FIG. 1; however, the mode-switching control of the present invention is applicable analogously, in cases in which the hybrid vehicle is equipped with the drive system shown in FIG. 2.

In this case, an auxiliary transmission 31 of the hybrid vehicle is equipped with the drive system of FIG. 2 enters a second gear selection state through engagement by a high clutch H/C (friction element for high gear selection), a first gear selection state through engagement by a low brake LB (friction element for low gear selection), or a neutral state in which both of these are released and power transmission is not carried out, whereby, basically, in a running condition requiring the second gear selection state of engagement by the auxiliary transmission 31, the high clutch H/C (friction element for high gear selection) is employed as the transmission clutch CL in FIG. 1, and in a running condition requiring the first gear selection state of engagement by the auxiliary transmission 31, the low brake L/B (friction element for low gear selection) is employed as the transmission clutch CL in FIG. 1.

However, during EV→HEV mode-switching, it is advantageous to employ the high clutch H/C (friction element for high gear selection) as the transmission clutch CL in FIG. 1, irrespective of the aforedescribed running condition, and to accomplish EV→HEV mode-switching by engaging this high clutch H/C (friction element for high gear selection) in step S17.

The reason is that because the input-side rotation speed of the high clutch H/C (friction element for high gear selection) is faster than the input-side rotation speed of the low brake L/B (friction element for low gear selection), acceleration of the input-side rotation speed of the high clutch H/C (friction element for high gear selection) obtained through engine startup (cranking) in step S15 or step S18 is higher than is acceleration of the input-side rotation speed of the low brake L/B (friction element for low gear selection), and synchronization of clutch input/output rotation (the timing at which a "Yes" determination is made in step S16) through cranking of the engine 1 can take place sooner, increasing the responsiveness of EV→HEV mode-switching.

The invention claimed is:

1. A mode-switching control device for a hybrid vehicle, the vehicle including an electric motor and an engine as power sources, the engine being drive-coupled to vehicle wheels via a transmission for which oil from a pump driven by the engine is the working medium, the transmission and the vehicle wheels being releasably coupled by a clutch within the transmission, the hybrid vehicle being configured to release the clutch and stop the engine to select an electric operation mode in which travel is accomplished by the electric motor only, or to start up the engine and engage the clutch to select a hybrid operation mode in which travel is accomplished using the electric motor and the engine, the mode-switching control device comprising:
   a controller programmed to cause the engagement of the clutch to be carried out while the startup of the engine is in progress at a point in time preceding initiation of self-sustaining running by the engine and prior to an input/output rotation difference of the clutch being zero during switching from the electric operation mode to the hybrid operation mode.

2. The mode-switching control device for a hybrid vehicle according to claim 1, wherein
   the hybrid vehicle includes a motor/generator drive-coupled to the engine, the engine being arranged and configured to be started up by at least one of the motor/generator and a starter motor, and
   the mode-switching control device, in a low-vehicle speed range less than a set vehicle speed, being configured to startup the engine by the starter motor, and, in a high-vehicle speed range at or above the set vehicle speed, being configured to startup the engine by the motor/generator.

3. The mode-switching control device for a hybrid vehicle according to claim 2, wherein
   the set vehicle speed is an upper limit vehicle speed of a low-vehicle speed zone in which vehicle speed-corresponding rotation inertia of a transmission-side rotation system that experiences an increase in rotation through the engaging of the clutch during the mode-switching is less than the engaging force of the clutch determined by the amount of oil from the pump in accordance with engine cranking speed obtained from the starter motor during startup.

4. The mode-switching control device for a hybrid vehicle according to claim 3, wherein
   the set vehicle speed is an upper limit vehicle speed of a low-vehicle speed zone in which vehicle speed-corresponding rotation inertia of a transmission-side rotation system that experiences an increase in rotation through the engaging of the clutch during the mode-switching is less than the engaging force of the clutch determined by the amount of oil from the pump in accordance with engine cranking speed obtained from the starter motor during startup.

5. A mode-switching control device for a hybrid vehicle, the vehicle including an electric motor and an engine as power sources, and also including a motor-generator that is drive-coupled to the engine, the engine being arranged and configured to be started up by at least one of the motor/generator and a starter motor and being drive-coupled to vehicle wheels via a transmission for which oil from a pump driven by the engine is the working medium, the transmission and the vehicle wheels being decouplable by a clutch within the transmission by releasing the clutch and stopping the engine to select an electric operation mode in which travel is accomplished by the electric motor only, or by starting up the engine and engaging the clutch, to select a hybrid operation mode in which travel is accomplished using the electric motor and the engine, the mode-switching control device comprising:
   a controller programmed to, during startup of the engine and engagement of the clutch to be carried out at the time of mode-switching from the electric operation mode to the hybrid operation mode, cause engagement of the clutch to be carried out during engine startup preceding initiation of self-sustaining running by the engine, and in a low-vehicle speed range less than a set vehicle speed, being programmed to startup the engine by the starter motor, and, in a high-vehicle speed range at or above the set vehicle speed, being programmed to startup the engine by the motor/generator.

* * * * *